(12) United States Patent
Oikawa

(10) Patent No.: US 8,429,339 B2
(45) Date of Patent: Apr. 23, 2013

(54) STORAGE DEVICE UTILIZING FREE PAGES IN COMPRESSED BLOCKS

(75) Inventor: Kohei Oikawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 228 days.

(21) Appl. No.: 13/052,361

(22) Filed: Mar. 21, 2011

(65) Prior Publication Data

US 2012/0131264 A1    May 24, 2012

(30) Foreign Application Priority Data

Nov. 19, 2010    (JP) ................................ 2010-259167

(51) Int. Cl.
*G06F 12/04*    (2006.01)

(52) U.S. Cl.
USPC ................... 711/103; 711/173; 711/E12.008; 711/E12.088

(58) Field of Classification Search ................ 711/103, 711/173, 208, E12.008, E12.088
See application file for complete search history.

(56) References Cited

U.S. PATENT DOCUMENTS

| 2008/0148004 | A1* | 6/2008 | Iren et al. ...................... 711/170 |
| 2011/0099321 | A1* | 4/2011 | Haines et al. .................. 711/103 |
| 2011/0320915 | A1* | 12/2011 | Khan ............................. 714/773 |

FOREIGN PATENT DOCUMENTS

JP    2007-094639    4/2007

OTHER PUBLICATIONS

Chanik Park, et al., "A High Performance Controller for NAND Flash-based Solid State Disk (NSSD)", IEEE, 2006, pp. 17-20.

* cited by examiner

*Primary Examiner* — Hal Schnee
(74) *Attorney, Agent, or Firm* — Turocy & Watson, LLP

(57) ABSTRACT

According to one embodiment, a storage device comprises a first storage unit having blocks, each including pages, a second storage unit having a free block list, and a free page list, and a control unit. In write data in units of blocks, the control unit generates compressed data blocks by compressing the data in units of blocks, writes the compressed data blocks to the blocks which can be written in accordance with the information held in the free block list, holds, in the free page list, the information about pages existing in free areas which are provided in the blocks holding compressed data blocks and which holds no compressed data blocks. In write data in units of pages, the control unit writes the data in units of pages to pages existing in the free areas, in accordance with the information held in the free page list.

6 Claims, 6 Drawing Sheets

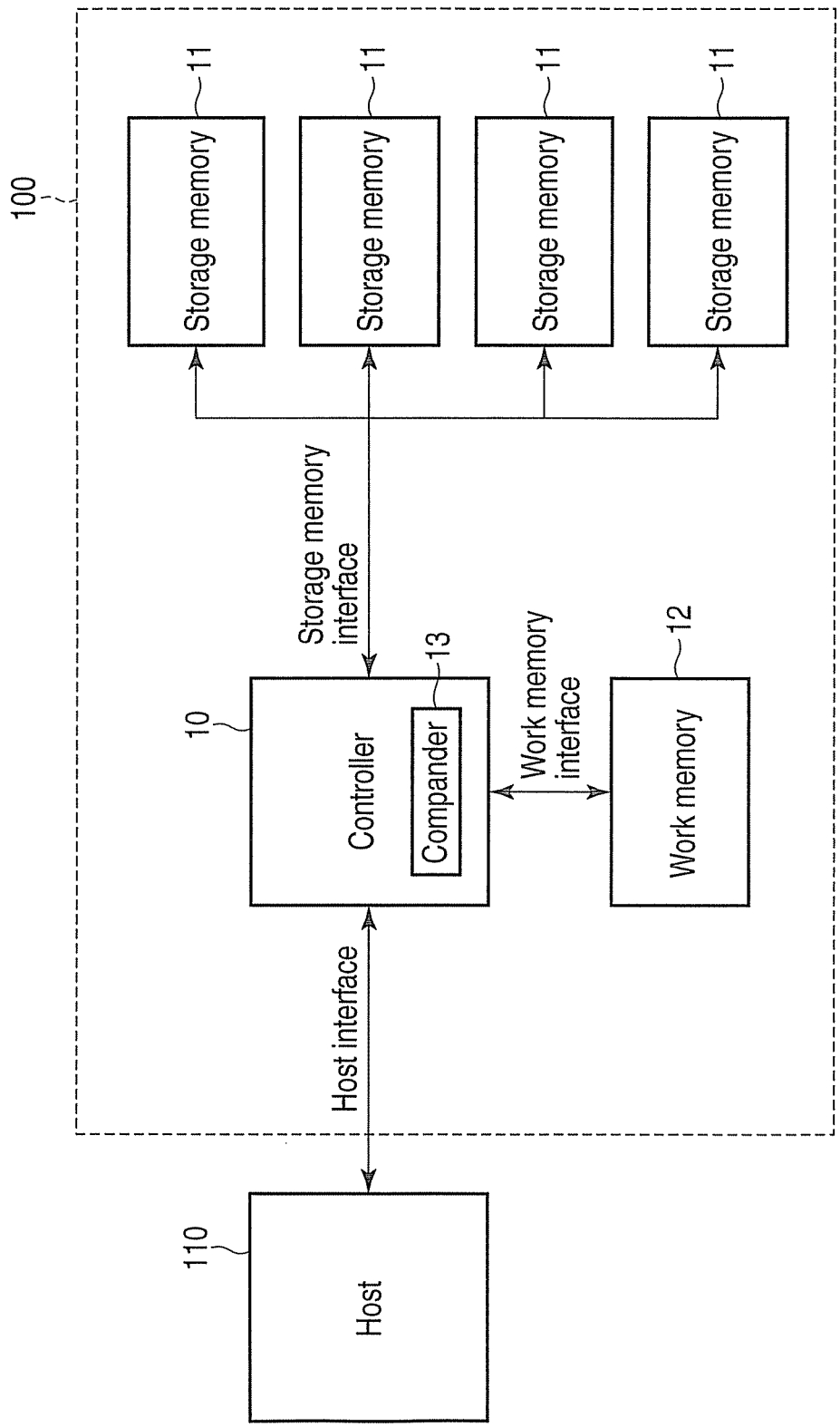
F I G. 1

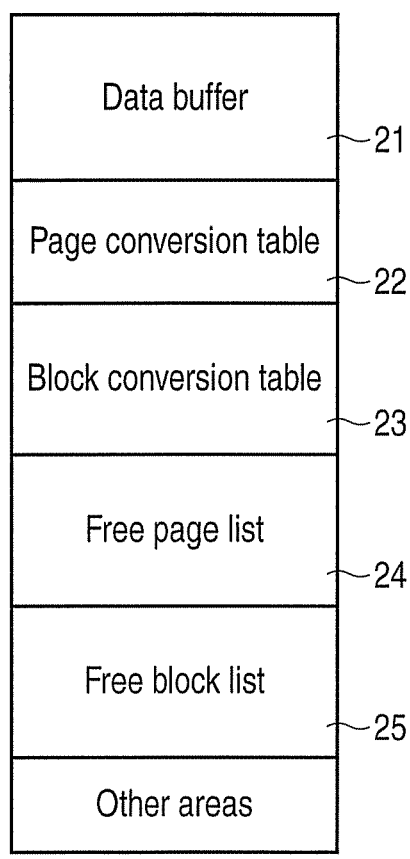
F I G. 2

US 8,429,339 B2

STORAGE DEVICE UTILIZING FREE PAGES IN COMPRESSED BLOCKS

CROSS-REFERENCE TO RELATED APPLICATIONS

This application is based upon and claims the benefit of priority from Japanese Patent Application No. 2010-259167, filed Nov. 19, 2010; the entire contents of which are incorporated herein by reference.

FIELD

Embodiments described herein relate generally to a storage device.

BACKGROUND

In recent years, the storage device called a solid state drive (SSD), which incorporates NAND flash memories, has come into use. More and more SSDs have been used in various apparatuses such as mobile terminals, notebook personal computers, enterprise servers, etc. The NAND flash memory is a semiconductor memory characterized by low cost and large storage capacity.

However, data must be erased from the NAND flash memory before new data is written to it. The number of times of rewriting (erasing) data in the NAND flash memory is limited (e.g., 1000 times at most). Further, data must be written in units pages (each being 2 KB, for example), and data must be erased in units of blocks (each being 1 MB, for example). To cope with these problems, various measures are taken in any storage device incorporating NAND flash memories in the form of an SSD (see, for example, A High Performance Controller for NAND Flash-based Solid State Disk (C. Park, NVSMW 2006, pp. 17-20)).

The SSD comprises a controller, a work memory and storage memories. The controller exchanges commands with a host (PC, for example). The storage memories are, for example, NAND flash memories, and stores data supplied from the host. The work memory is, for example, a SRAM or a DRAM. The work memory holds a logical/physical address conversion table for respective data pages, a logical/physical block address conversion table for respective data blocks, a free block list, and the like.

In the SSD, the main initiator of control is an access command issued by, and coming from, the host. First, the controller converts the address (logical address) of the host command to addresses (physical addresses) of the storage memories. The data in the storage memories is thereby accessed. This is because the data at an address in any NAND flash memory must be erased to write new data to the same address, thereby to rewrite data in the NAND flash memory.

If the logical/physical address conversion is controlled, exclusively in units of pages (each being 2 KB, for example), the logical/physical address conversion tables will be inevitably too large to be held in the work memory. Therefore, the data is written in units of blocks (each being 1 MB, for example) into the storage memories. In this case, the data is managed in units of blocks in the logical/physical block address conversion table for respective data blocks.

Any blocks in which data is entirely rendered invalid during the write control or the garbage collection are managed in the form of a list (i.e., free block list). While data is being written in units of pages or blocks, more write areas may be required. In this case, information about blocks is extracted from the free block list, thereby providing write areas.

The control described above can disperse rewrite circuits to respective addresses. Nonetheless, as NAND flash memories are more miniaturized in the future, the number of times the data is rewritten will decrease. It is therefore necessary to control the data writing at higher efficiency. One method that may raise the efficiency of write control is to compress the data to be written to the NAND flash memories.

In Jpn. Pat. Appln. KOKAI Publication No. 2007-94639, for example, the controller first compresses the data supplied from the host and then stores the data into the NAND flash memories. The data transferred from the host to the NAND flash memories is thereby reduced in amount.

If the data is compressed in units of pages or blocks and then stored into the NAND flash memories, however, the storage area thereby rendered free will be wasted. Further, if the data items are arranged on the basis of the sizes they have after having been compressed, the locations of the data items must be managed in minute units. Consequently, each entry in the conversion table will have a very large size. This makes it difficult to manage the data in the work memory. In addition, the data is erased only in units of blocks. From this point of view, since any data item may extend over a block boundary, the control complex will be complicated.

BRIEF DESCRIPTION OF THE DRAWINGS

FIG. 1 is a block diagram showing a storage device according to a first embodiment;

FIG. 2 is a block diagram showing an exemplary configuration of the work memory according to the first embodiment;

DETAILED DESCRIPTION

Figure 3:
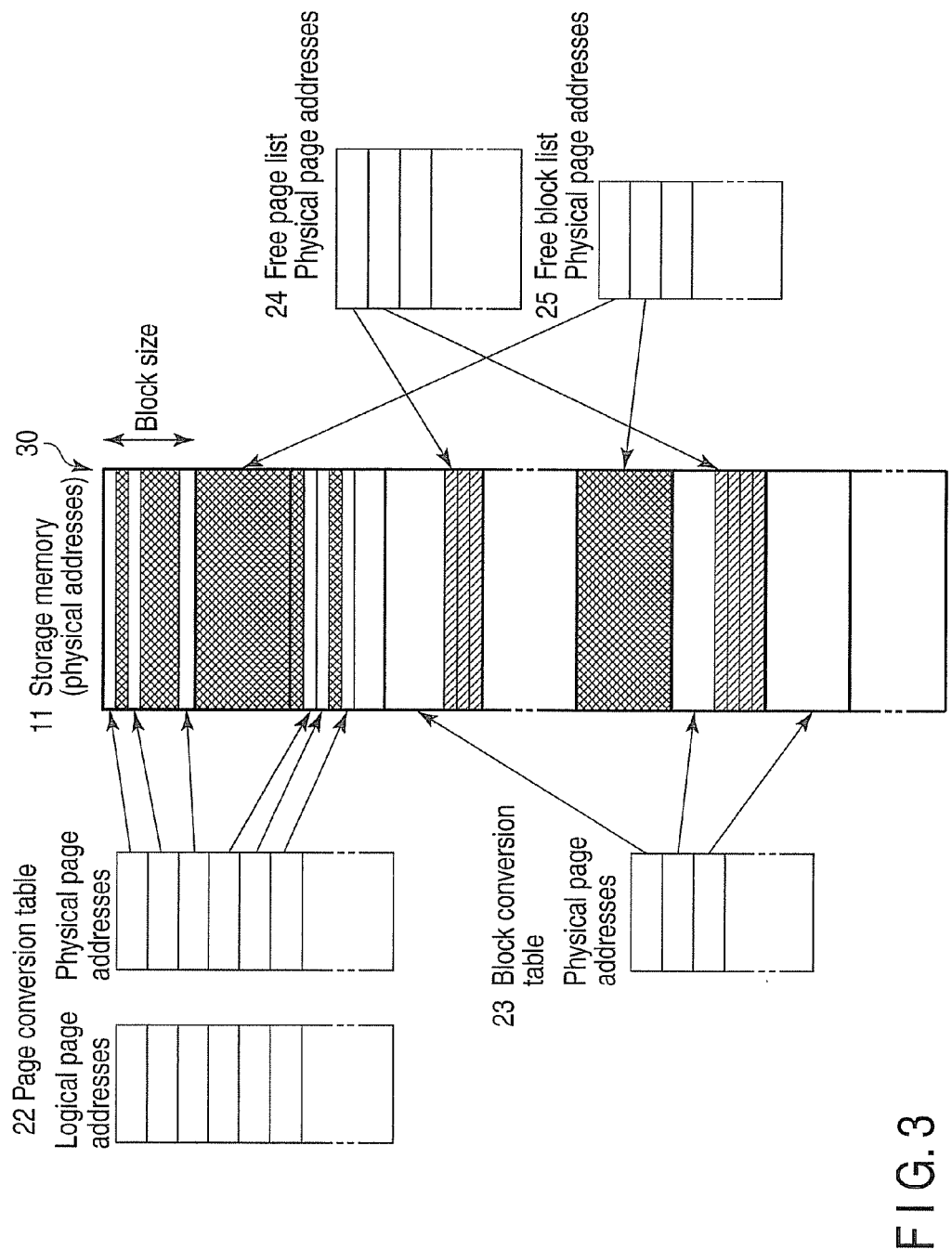
FIG. 3 is a diagram showing the control performed in the storage device according to the first embodiment.

In general, according to one embodiment, a storage device comprises: a first storage unit having blocks, each including pages; a second storage unit having a free block list, and a free page list; and a control unit. In write data in units of blocks, the control unit generates compressed data blocks by compressing the data in units of blocks, writes the compressed data blocks to the blocks which can be written in accordance with the information held in the free block list, holds, in the free page list, the information about pages existing in free areas which are provided in the blocks holding compressed data blocks and which holds no compressed data blocks. In write data in units of pages, the control unit writes the data in units of pages to pages existing in the free areas, in accordance with the information held in the free page list.

The embodiments will be described with reference to the accompanying drawings. In the drawings, the components of one embodiment, which are identical to those of the other embodiment, are designated by the same reference numbers.
<First Embodiment>

A storage device according to the first embodiment will be described first. The first embodiment is a storage device that is so configured that data is compressed and then written before written in units of blocks (data blocks). The data blocks compressed are then stored, providing free storage areas. In the free storage areas thus provided, non-compressed data is written in small units (in units of pages).

[Configuration]

An exemplary configuration the storage device according to the first embodiment may have will be described with reference to FIG. 1, FIG. 2 and FIG. 3.

FIG. 1 shows the configuration of the storage device according to the first embodiment.

As shown in FIG. 1, the storage device 100 comprises a controller (control circuit) 10, a plurality of storage memories 11, and a work memory 12.

The controller 10 comprises a host interface, a storage memory interface, and a work memory interface. The host interface is, for example, a serial ATA/parallel ATA interface, and can exchange commands with a host 110. The storage memory interface exchanges commands with the storage memories 11. The work memory interface exchanges commands with the work memory 12. The controller 10 therefore transfers data between the storage memories 11 and the host 110 through the work memory 12.

The storage memories 11 are, for example, NAND flash memories and store data coming from the host. The storage memories 11 also performs processes, such as data reading and data erasing, in accordance with the commands supplied from the controller 10.

The work memory 12 is, for example, a static random access memory (SRAM) or a dynamic random access memory (DRAM). It may instead be a register file or a storage memory identical to the storage memories 11. Alternatively, it may comprise a register file and a storage memory. The work memory 12 temporarily stores data used to control the storage memories 11.

In this embodiment, the controller 10 has a compressor and decompressor 13. The compressor and decompressor 13 performs a process, exclusively to access the data blocks stored in the storage memories 11. More specifically, the compressor and decompressor 13 compresses data blocks, generating compressed data blocks, before the data blocks are written to the storage memories 11, and decompresses the compressed data blocks before the data blocks are read from the storage memories 11.

Even if the data is accessed in units of blocks, the data compressed may have a larger size than before compressed or may be, in all probability, random-accessed. In this case, the data may not be compressed or decompressed. This compression/decompression function of the compressor and decompressor 13 can be implemented either by hardware or by software.

FIG. 2 shows an exemplary configuration of the work memory 12 according to this embodiment may have.

As shown in FIG. 2, the work memory 12 is composed of a data buffer 21, a page conversion table 22, a block conversion table 23, a free page list 24, and a free block list 25. These components of the work memory 12 will be described later in detail, with reference to FIG. 3.

FIG. 3 shows exemplary configurations the work memory 12 and storage memories 11 may have, and also shows the control the controller 10 performs. Any addresses supplied from the host 110 will be called "logical addresses," and the addresses actually existing in the storage memories (NAND flash memories) 11 will be called "physical addresses."

In FIG. 3, a memory map 30 is illustrated, which represents the physical addresses of the storage memories 11. Of the memory map 30, any blank part is an area in which valid data is stored, and any shaded part is an area in which invalid data is stored. The valid data and the invalid data are logically valid and invalid, respectively, irrespectively of whether they are written or not to the storage memories 11. Of the memory map 30, any hatched part is a free area provided when a data block is compressed.

The page conversion table 22 has entries, each consisting of a logical page address and a physical page address. That is, the page conversion table 22 holds the logical addresses and physical addresses of data pages, to which addresses data items (valid data items) are written. In the page conversion table 22, the logical page addresses supplied from the host 110 are associated with the respective physical page addresses existing in the storage memories 11.

The block conversion table 23 has entries, each consisting of a physical page address. The block conversion table 23 holds the physical addresses of data blocks, to which data items (valid data items) are written. In the block conversion table 23, the logical block addresses supplied from the host 110 are associated with the respective physical block addresses existing in the storage memories 11.

The free page list 24 has entries, each consisting of a physical page address. The free page list 24 holds the physical addresses of the first data pages of the free areas provided in the block as the data compressed in units of blocks is stored in the block. The physical address following any first data page stored in a free area can be calculated from the physical address of the first data page. Particularly, the physical address of any last data page can be easily calculated from the physical address of the first data page, because the physical address of the last data page is a boundary with the next physical block.

The free block list 25 has entries, each consisting of a physical block address. The free block list 25 holds the physical addresses of blocks in which all data is invalidated.

In this embodiment, not only the free block list 25 can manage any block in which all data is invalidated, but also the free page list 24 can manage, as a data page, that part (free area) of any block, which has been made free (invalidated) because the data block is compressed.

[Writing of Data Blocks (Writing in Units of Blocks)]

How data blocks are written to the storage device 100 according to this embodiment will be explained with reference to FIG. 4.

Figure 4:
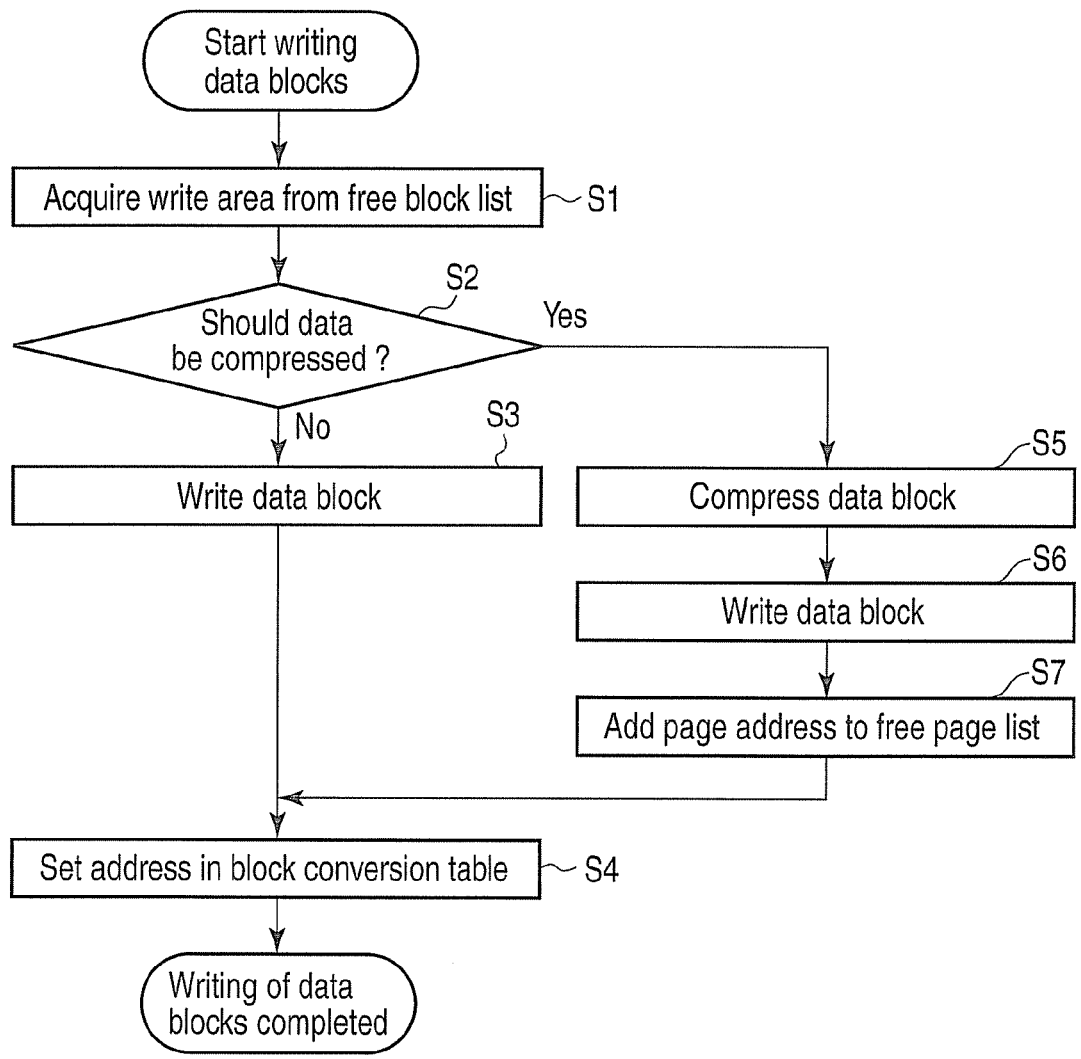
FIG. 4 is a flowchart explaining how data blocks are written to the storage device according to the first embodiment.

FIG. 4 is a flowchart explaining how data blocks are written to the storage device 100 according to the first embodiment.

As shown in FIG. 4, an area to which data can be written in units of blocks is acquired from the free block list 25 in Step S1, in the same manner as in the conventional method. At this point, invalid data may exist in the write area thus acquired. In this case, the invalid data is erased, if necessary.

Next, in Step S2, whether a data block should be compressed or not is determined. At this point, the tendency of the data to write is examined, thereby determining whether the data block will be smaller if compressed. If the data block will be smaller if compressed, it is compressed. If the data block will be larger if compressed, it is not compressed.

If it is determined in Step S2 the data block should not be compressed, the data block is written in Step S3. That is, the data block in ordinary form is written to a storage memory 11. Then, in Step S4, the physical address to which the data block is written is set in the block conversion table 23.

In Step S2, it may be determined that the data block should be compressed. In this case, the data block is compressed in Step S5. That is, the size of the data block is reduced.

Next, in Step S6, the data block compressed is written. More precisely, the data block compressed in Step S5 is written to the storage memory 11. In the storage memory 11, the compressed data block is stored at the same storage location as a data block not compressed. The compressed data block is written, page by page. That is, the first page of the block acquired from the free block list 25 is written first. At this point, the compressed data block is small. Therefore, the block acquired from the free block list 25 has a part (free area, e.g., the latter half page) to which no data is written.

Then, in Step S7, the physical address of the first page now stored in the area rendered free because the compressed data block is written is set in the free page list 24. Thereafter, in Step S4, the physical address to which the compressed data block is written is set in the block conversion table 23.

The process of writing the data block is thus completed. If the data block is compressed, the data block compressed is made valid through the preceding processes. The data page can be written to a free area.

[Writing of Data Pages (Writing in Units of Pages)]

How data pages are written to the storage device 100 according to this embodiment will be explained with reference to FIG. 5.

Figure 5:
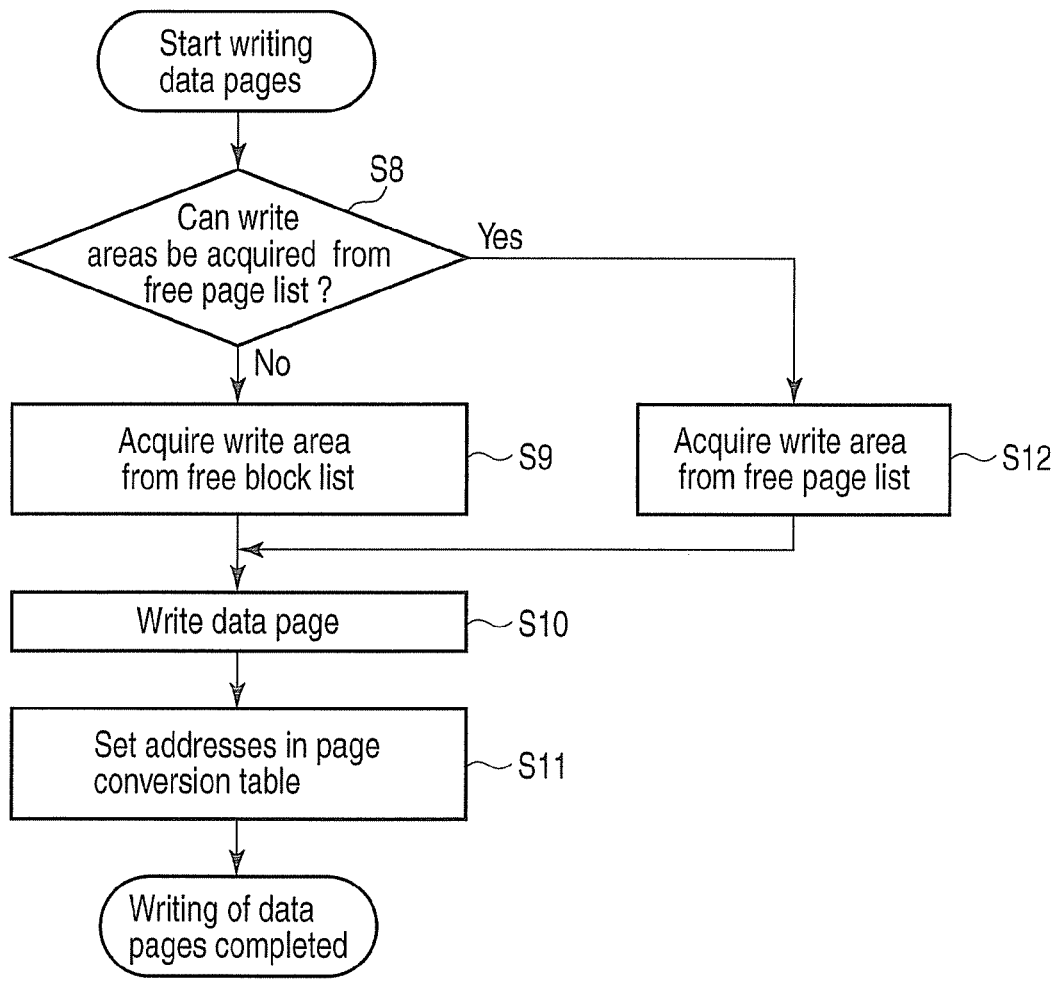
FIG. 5 is a flowchart explaining how data pages are written to the storage device according to the first embodiment.

FIG. 5 is a flowchart explaining how data pages are written to the storage device 100 according to this embodiment.

As shown in FIG. 5, it is determined in Step S8 whether any write area can be acquired from the free page list 24.

If it is determined in Step S8 that no write areas can be acquired from the free page list 24, the process goes to Step S9. In Step S9, a write area to which data can be written in units of pages is acquired from the free block list 25. At this point, the write area thus acquired may hold invalid data. In this case, the invalid data is erased, if necessary.

Next, in Step S10, a data page is written to the area acquired from the free block list 25. Then, in Step S11, the physical page address to which the data page has been written is set in the page conversion table 22, along with conversion information.

In Step S8, write areas may be acquired from the free page list 24. If this is the case, the process goes to Step S12. In Step S12, a write area to which the data page is written is acquired from the free page list 24.

Next, in Step S10, the data page is written to the write area acquired from the free page list 24. That is, the data page is written to a free area. As a result, the data block is consists of a compressed data block and a data page, which are mixed together.

Thereafter, in Step S11, the physical page address to which the data page is now written and the conversion information are set in the page conversion table 22.

Thus, the process of writing the data page is thus completed.

[Data Reading]

How data is read in the storage device 100 according to this embodiment will be explained below. The method of reading data in this embodiment is not limited to a particular one. Rather, a various methods known in the art can be employed.

In order to read any data page, the page conversion table 22 is used as in the conventional method, thereby reading the data page (i.e., object data page) from the storage memory 11.

In order to read any data block, the block conversion table 23 is used as in the conventional method, thereby reading the data block (i.e., object data block) from the storage memory 11. If the object data block has been compressed, it is first decompressed and then read. If the object data block has not been compressed, it is read from without being processed at all.

The reading of data from the storage memory 11 may be stopped when all data required is read or when one data block is read. In order to determine whether data blocks are compressed or not, at least one bit is needed per data block. If the storage memory 11 has any redundant bits, they may be used. Alternatively, one bit may be added each entry in the block conversion table 23.

The processes of writing data blocks, data pages and reading data, described above, are controlled by the controller 10 shown in FIG. 1.

[Advantages]

In the first embodiment described above, data blocks are compressed before they are written. The compressed data blocks are stored (written) to the blocks in the storage memory 11. As the data blocks are compressed, a part of the storage area is made free in the storage memory 11. The resultant free area is utilized to hold data pages. This can increase the efficiency of writing data to the storage memory 11.

Since that part of the storage area, which has been made free because of the data compression, is used without being wasted, the data can be rewritten fewer times and can be dispersed over all blocks of the storage memory 11. This enhances the reliability of the storage device 100 that incorporates memories, such as NAND flash memories, which are more and more miniaturized and in which data can be rewritten but a limited number of times.

Moreover, in this embodiment, the locations at which compressed data blocks are stored are aligned with the locations where the data blocks should be stored if they were not compressed. This makes it easy to manage the data stored and to control the writing and reading data. As a result, the overhead of the controller 10 can be suppressed.

<Second Embodiment>

A storage device according to a second embodiment will be described below. The second embodiment is a modification of the first embodiment, and incorporates multi-level cell (MLC) NAND flash memories that are limited in terms of data-writing order. In the second embodiment, any compressed data block is written, starting with the lowest page. The components of the second embodiment, which are identical to those of the first embodiment, are designated by the same reference numbers and will be described in respect of different features only.

Each of the MLC NAND flash memories is a memory in which a multi-bit information is written to one memory cell. In some of the memory cells provided in each MLC NAND flash memory, different addresses may be allocated to the respective bits. In this case, the bits may be written to the memory cells in a prescribed order. In some of the memories, data can be written faster to an address which data is written earlier than to any other address to which data is written later.

How to write, for example, 2-bit data to one memory cell will be explained below. The address area to which data is earlier written will be called the "lower page," and the address area to which data is later written will be called the "upper page."

[Writing of Data Block and Writing of Data Page]

How a data block and a data page are written to the storage device 100 according to this embodiment will be explained below with reference to FIG. 6.

Figure 6:
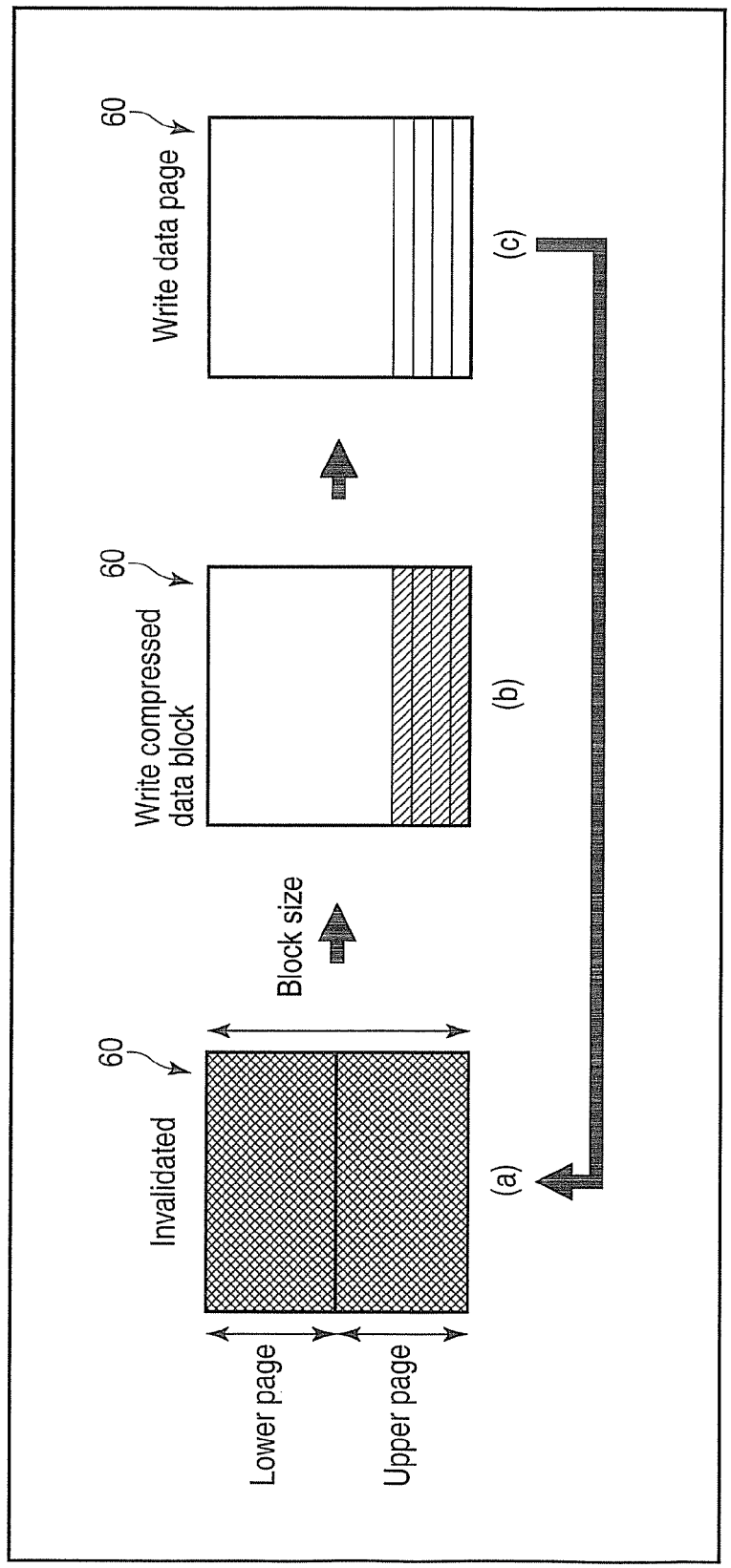
FIG. 6 is a diagram showing the control performed in a storage device according to a second embodiment.

FIG. 6 is a diagram showing the control performed in the storage device 100 according to this embodiment. More precisely, FIG. 6 shows how addresses are allocated to the lower and upper pages of one data block and how the data block is written to the storage device 100. As in FIG. 3, any blank part is an area in which valid data is stored, any shaded part is an area in which invalid data is stored, and any hatched part is a free area provided when a data blocks is compressed.

To be more specific, in block 60, the data may be all invalid as shown at (a) in FIG. 6, may contain compressed data block as shown at (b) in FIG. 6, or may contain data page in a free area as shown at (c) in FIG. 6.

As shown at (a) in FIG. 6, the page addresses are logically arranged in the order the pages have been written. That is, in the block 60 that includes memory cells holding the lower and upper pages, the addresses are so allocated that the lower page of each memory cell is first written and the upper page thereof is then written.

Since the addresses are so allocated in the block 60, the lower page is written first, whereby the compressed data block is written as shown at (b) in FIG. 6, and thereafter the other data page is written as shown at (c) in FIG. 6, to the free area (e.g., part of the upper page) generated by writing the compressed data block.

As seen from FIG. 4 and FIG. 5, the compressed data block are reliably written always in the order shown in FIG. 6, in consecutive steps (a), (b) and (c), if compressed data block is written to the block 60, thanks to the control so performed in the first embodiment. That is, any compressed data is first written to the lower pages, because the compressed data block is written before the other data page.

[Advantage]

In the storage device 100 according to the second embodiment, which has MLC NAND flash memories, addresses are so allocated that data is written, first to the lower-page side of any memory cell provided in the block 60, and then to the upper-page side thereof. As a result, the compressed data block that should be written first is written to the lower-page side before the upper-page side. The lower page can be written faster than the upper page. That is, the compressed data block can be written at high speed.

Data can be written in units of blocks at high speed, particularly if the host 110 issues a command for writing data of large size. This can enhance the ability of performing burst write.

A long time is usually spent in compressing data. In this embodiment, however, compressed data blocks are written at high speed, cancelling out the time spend in compressing data. This helps to reduce an increase in the data processing time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a first storage unit configured to store data supplied from a host;
   a second storage unit configured to store information for managing the first storage unit; and
   a control unit configured to transfer data between the host and the first storage unit,
   wherein
   the first storage unit provides blocks, each of the blocks including pages;
   the second storage unit has a free block list holding information about which blocks of the blocks provided in the first storage unit can be written, and a free page list holding information about which pages of the pages provided in the first storage unit can be written; and
   when the control unit transfers the data supplied from the host to the first storage unit, the control unit
   generates compressed data blocks by compressing the data supplied from the host in units of blocks,
   writes the compressed data blocks to the blocks which can be written in accordance with the information held in the free block list,
   holds, in the free page list, information about pages existing in free areas, which are pages in the blocks holding compressed data blocks and which do not hold compressed data blocks, and
   writes additional data supplied from the host in units of pages to the pages existing in the free areas, in accordance with the information held in the free page list.

2. The device of claim 1, wherein the free block list holds a physical address of each of the blocks in which all data is invalidated, and the free page list holds a physical address the a first page held in each of the free areas.

3. The device of claim 1, wherein the first storage unit is a NAND flash memory.

4. The device of claim 1, wherein the second storage unit is one of a SRAM and a DRAM.

5. The device of claim 1, wherein the control unit writes the compressed data blocks beginning with a first page in each of the blocks which can be written.

6. The device of claim 1, wherein the first storage unit is a NAND flash memory having memory cells configured to store n different states, where n is an integer greater than 2, and each of the blocks in the first storage unit includes lower pages and upper pages; and
   the control unit writes the compressed data blocks beginning with the lower page of each of the blocks which can be written.

* * * * *